United States Patent
Albers

(10) Patent No.: US 7,937,115 B2
(45) Date of Patent: May 3, 2011

(54) METHOD FOR DEVELOPING A PERSONALIZED MUSICAL RING-TONE FOR A MOBILE TELEPHONE BASED UPON CHARACTERS AND LENGTH OF A FULL NAME OF A USER

(75) Inventor: Scott Albers, New York, NY (US)

(73) Assignee: Scott Albers, New York City ( * ) Notice: Subject to any disclaimer, the term of this patent is extended or adjusted under 35 U.S.C. 154(b) by 934 days.

(21) Appl. No.: 11/717,492

(22) Filed: Mar. 13, 2007

(65) Prior Publication Data

US 2007/0218964 A1 Sep. 20, 2007

Related U.S. Application Data

(60) Provisional application No. 60/782,472, filed on Mar. 15, 2006.

(51) Int. Cl.
*H04B 1/38* (2006.01)
*G10H 1/00* (2006.01)

(52) U.S. Cl. .......................................... 455/567; 84/600

(58) Field of Classification Search .................. 455/567; 84/600

See application file for complete search history.

(56) References Cited

U.S. PATENT DOCUMENTS

| 2004/0106395 A1* | 6/2004 | Suganuma et al. | 455/412.2 |
| 2004/0198471 A1* | 10/2004 | Deeds | 455/567 |
| 2005/0246193 A1* | 11/2005 | Roever et al. | 705/1 |

* cited by examiner

*Primary Examiner* — Wen W Huang
(74) *Attorney, Agent, or Firm* — Ringtones Int'l

(57) ABSTRACT

A method for developing a personalized music based (preferably blues-music based) ring-tone for a mobile telephone based upon characters and length of a full name of a user of the mobile telephone. The method includes the steps of logging onto an appropriate website having an appropriate algorithm programed therein, navigating through the appropriate website to an appropriate input box therein, entering the full name of the user in the appropriate input box of the appropriate website to form an inputted full name, activating the appropriate algorithm in the appropriate website, correlating by the appropriate algorithm each letter of the inputted full name of the user to a look-up table stored in a memory that correlates alphabetic letters to notes to form correlated notes based on a 5-note music scale and applied to one of several pre-determined rhythm tracks, keys, and tempos and based upon the length of the full name of the user, retrieving the correlated notes, playing back to the user using an MIDI instrument the correlated notes to form the personalized blues-based ring-tone for the mobile telephone based upon the characters and the length of the full name of the user of the mobile telephone, and downloading by the user of the mobile telephone the personalized blues-based ring-tone to the mobile telephone.

2 Claims, 8 Drawing Sheets

| Clock | 20000000 |
| Fosc/4 | 5000000 |
| Divider | 1 |
| Freq | 5000000 |

| Octave | 4 | | | 5 | | | |
|---|---|---|---|---|---|---|---|
| Note | Desired | Divider | Actual | Desired | Divider | Actual | Desired |
| A | 440 | 11364.00 | 440.0 | 880 | 5682.00 | 880.0 | 1760 |
| A# | 466 | 10726.00 | 466.2 | 932 | 5363.00 | 932.3 | 1865 |
| B | 494 | 10123.00 | 493.9 | 988 | 5062.00 | 987.8 | 1976 |
| C | 523 | 9555.00 | 523.3 | 1047 | 4778.00 | 1046.5 | 2093 |
| C# | 554 | 9019.00 | 554.4 | 1109 | 4509.00 | 1108.9 | 2218 |
| D | 587 | 8513.00 | 587.3 | 1175 | 4256.00 | 1174.8 | 2349 |
| D# | 622 | 8035.00 | 622.3 | 1244 | 4018.00 | 1244.4 | 2489 |
| E | 659 | 7584.00 | 659.3 | 1319 | 3792.00 | 1318.6 | 2637 |
| F | 698 | 7158.00 | 698.5 | 1397 | 3579.00 | 1397.0 | 2794 |
| F# | 740 | 6757.00 | 740.0 | 1480 | 3378.00 | 1480.2 | 2960 |
| G | 784 | 6378.00 | 783.9 | 1568 | 3189.00 | 1567.9 | 3136 |
| G# | 830 | 6024.00 | 830.0 | 1660 | 3012.00 | 1660.0 | 3320 |

| Duration | Octave |
|---|---|
| 1 = Full Note<br>2 = Half Note<br>4 = Quarter Note<br>8 = Eighth Note<br>16 = Sixteenth Note<br>32 = Thirty second Note | 5 = A Is 440Hz<br>6 = A Is 880Hz<br>7 = A Is 1.76KHz<br>8 = A Is 3.52KHz |

FIG. 6

| Clock | 20000000 |
| --- | --- |
| Fosc/4 | 5000000 |
| Divider | 1 |
| Freq | 5000000 |

| Octave | | 4 | | |
| --- | --- | --- | --- | --- |
| Note | Desired | Divider | Actual | |
| A | 440 | 11364.00 | 440.0 | |
| A# | 466 | 10726.00 | 466.2 | |
| B | 494 | 10123.00 | 493.9 | |
| C | 523 | 9555.00 | 523.3 | |
| C# | 554 | 9019.00 | 554.4 | |
| D | 587 | 8513.00 | 587.3 | |
| D# | 622 | 8035.00 | 622.3 | |
| E | 659 | 7584.00 | 659.3 | |
| F | 698 | 7158.00 | 698.5 | |
| F# | 740 | 6757.00 | 740.0 | |
| G | 784 | 6378.00 | 783.9 | |
| G# | 830 | 6024.00 | 830.0 | |

| | 5 | | | |
| --- | --- | --- | --- | --- |
| Desired | Divider | Actual | Desired | |
| 880 | 5682.00 | 880.0 | 1760 |
| 932 | 5363.00 | 932.3 | 1865 |
| 988 | 5062.00 | 987.8 | 1976 |
| 1047 | 4778.00 | 1046.5 | 2093 |
| 1109 | 4509.00 | 1108.9 | 2218 |
| 1175 | 4256.00 | 1174.8 | 2349 |
| 1244 | 4018.00 | 1244.4 | 2489 |
| 1319 | 3792.00 | 1318.6 | 2637 |
| 1397 | 3579.00 | 1397.0 | 2794 |
| 1480 | 3378.00 | 1480.2 | 2960 |
| 1568 | 3189.00 | 1567.9 | 3136 |
| 1660 | 3012.00 | 1660.0 | 3320 |

METHOD FOR DEVELOPING A PERSONALIZED MUSICAL RING-TONE FOR A MOBILE TELEPHONE BASED UPON CHARACTERS AND LENGTH OF A FULL NAME OF A USER

1. CROSS REFERENCE TO RELATED APPLICATIONS

The instant non-provisional patent application claims priority from provisional patent application No. 60/782,472, filed on Mar. 15, 2006, entitled CUSTOMIZED RING TONES, and incorporated herein by reference thereto.

2. BACKGROUND OF THE INVENTION

A. Field of the Invention

The embodiments of the present invention relate to a method for developing a ring-tone for a mobile telephone, and more particularly, the embodiments of the present invention relate to a method for developing a personalized music (preferably blues) ring-tone for a mobile telephone based upon characters and length of a full name of a user of the telephone.

B. Description of the Prior Art

Conventional terminals, such as mobile telephones, have detectable outputs, such as ringing tones, ringing tunes or the like, similar to ordinary telephones, which have mainly resembled the ringing of a clock. When a mobile phone of a specific make and model had one fixed ringing tone, however, problematic situations occurred. In this regard, when two users in the same space have the same type of mobile phone and thus the same kind of ringing tone, it can be confusing as to whose phone is actually ringing. This source of confusion has been ameliorated by making the ringing tone dependent on either the user's own telephone number or the telephone number of a caller. The ringing tones produced on the basis of two almost identical telephone numbers, however, may sound so much alike that it is difficult to distinguish one ringing tone from the other.

Further improvements to providing more distinguishable ringing tones have been made as mobile phones have become more advanced. Currently, mobile phones normally have several pre-stored ringing tones from which the user can select a preferred ringing tone. In addition to ordinary ringing tones, melodies from familiar pieces of music have been implemented as ringing tones from which a user may select.

With the enormous increase in the use of mobile phones, it has turned out that even as many as ten different programmed ringing tones are sometimes not enough to satisfy mobile phone users. This situation has been improved by enabling ringing tones to be programmed by the user via the user interface of the telephone or other communication device. One technique has been presented where a user can input different kinds of parameters, which define a pulsed ringing tone sequence having parameters, such as frequency, pulse length, the number of pulses in a group, period between pulses, the number of pulse groups, etc. Another technique for programming a ringing tone has been presented where it is possible to program a ringing tone as notes by inputting the notes graphically on a stave that is shown on a display.

Another technique for programming a ringing tone utilizes the Internet, where Web sites exist from which users can download ringing tones, such as popular music, to their mobile phones. In this regard, recent developments in Internet protocols have resulted in the creation of the Wireless Application Protocol ("WAP") specification. The WAP specification in turn operates according to the Handheld Device Markup Language ("HDML") or Wireless Markup Language ("WML") and allows Internet content to be adapted for use on narrow bandwidth and limited screen size handheld devices, such as mobile phones.

Mobile phone manufacturers are currently beginning to embed high-value added applications, such as WAP compliant micro-browsers in mobile phones allowing the mobile phones to function as a client for services and content from the Internet through a wireless portal. Thus, Web sites are beginning to offer ringing tones that can be delivered.

Numerous innovations for ring tone related devices have been provided in the prior art that will be described below, which are in chronological order to show advancement in the art, and which are incorporated herein by reference thereto. Even though these innovations may be suitable for the specific individual purposes to which they address, they each differ in structure, and/or operation, and/or purpose from the embodiments of the present invention in that they do not teach a method for developing a personalized music-based ring-tone for a mobile telephone based upon characters and length of a full name of a user of the mobile telephone.

(1) U.S. Pat. No. 6,308,086 to Yoshino.

U.S. Pat. No. 6,308,086 issued to Yoshino on Oct. 23, 2001 in class 455 and subclass 567 teaches a portable cellular phone, including the ability to customize a ring signal. The device accepts a spoken voice signal entered via a microphone and converts that signal into a digital audio signal. The device then obtains musical scale information from the digital audio signal by extracting frequency components. The device uses those frequency components to generate an audio output signal based on the extracted musical scale frequency components. This output signal can then be used as the ring signal or for other purposes. Thus, a user can input a desired musical scale using the user's voice to customize the ring signal without relying solely on keypad operations.

(2) U.S. Pat. No. 6,927,331 to Haase.

U.S. Pat. No. 6,927,331 issued to Haase on Aug. 9, 2005 in class 84 and subclass 464 R teaches a method for the program-controlled visually perceivable representation of a music composition on the display of an electronic device. For this purpose, the music composition is reproduced on the display by a multitude of pre-determined 2D and/or 3D-color elements that are equal to the number of tones and/or meters of the music composition and which are configured in each case in such a manner that the background of every color element is formed in a basic color that is assigned to the major or minor key of the tone and/or meter corresponding to the color element in a special color circle of fifths of the basic colors of all major and minor keys having twelve colored circular segments 1 to 12, respectively, 13 to 24 per semi-circle to which always one major and the corresponding minor key is assigned. In addition, one of twelve basic colors—which are different from one another—is assigned to every segment of every semi-circle of the color circle of fifths whereby the sequence of the selected twelve different basic colors of the segments 1 to 12 and the segments 13 to 24 is the same and the sequence of the selected twelve basic colors within the twelve segments of every semi-circle can be varied. The tones and/or meters are characterized on the display in a color of the color elements, which is taken in accordance with the position of the tone in each case on the scale of the major or minor key of the musical bar from an assigned color key scale.

(3) U.S. Pat. No. 6,967,276 to Futamase et al.

U.S. Pat. No. 6,967,276 issued to Futamase et al. on Nov. 22, 2005 in class 84 and subclass 622 teaches a sound-control apparatus in a portable terminal for sounding a music tone in association with operation of the portable terminal, which is controlled by a main CPU. In the sound-control apparatus, a memory memorizes music information representing a music tone and configuration information associated to a timbre of the music tone. An information-acquiring section acquires the music information and the configuration information from the memory. A tone-generating section is configured by the acquired configuration information to create a timbre specified by the configuration information. The tone-generating section operates according to the acquired music information to generate the music tone being represented by the music information and having the specified timbre. A dedicated CPU is provided separately from the main CPU for controlling the memory, the information-acquiring section, and the tone-generating section.

(4) United States Patent Application Publication Number 2006/0011044 to Chew.

United States Patent Application Publication Number 2006/0011044 published to Chew on Jan. 19, 2006 in class 84 and subclass 609 teaches a musical sequence formed on the keypad of a handheld electronic device. The numbered keys on the keypad of the handheld device are mapped directly to corresponding notes in an octave. The sequence of musical notes is entered by depressing at least one numbered key on the keypad and displaying a numerical representation of the sequence on the display screen of the handheld device.

(5) U.S. Pat. No. 7,020,497 to Deeds.

U.S. Pat. No. 7,020,497 issued to Deeds on Mar. 28, 2006 in class 455 and subclass 567 teaches a terminal adapted to communicate via a communications system, including a memory capable of storing a plurality of ringing tones. The plurality of ringing tones includes at least one set of at least two ringing tones associated with at least one event. The terminal also includes a controller capable of choosing a ringing tone from the set(s) of ringing tones based upon a predefined selection criteria, such as based upon a random search criteria or a sequential search criteria. The controller is further capable of generating signals directed to an output reproduction device that is capable of generating the chosen ringing tone in response to the terminal receiving an event associated with the at least one set of ringing tones including the chosen ringing tone.

(6) U.S. Pat. No. 7,050,573 to Okazaki et al.

U.S. Pat. No. 7,050,573 issued to Okazaki et al. on May 23, 2006 in class 379 and subclass 373.02 teaches a communication terminal apparatus, such as a portable telephone, where it is made possible to sound ring tones of good tone quality simply by using arbitrary music or the like. In a communication terminal conducting radio communication with a predetermined station and incorporating a music or speech data reproduction function, ring tones according to selected data included in previously prepared data for ring tones is outputted in response to an incoming call when a first mode has been set. Ring tones according to data of a previously set section included in music or speech data stored in a reproduction function section is outputted in response to an incoming call when a second mode has been set.

(7) United States Patent Application Publication Number 2007/0044639 to Farbood et al.

United States Patent Application Publication Number 2007/0044639 published to Farbood et al. on Mar. 1, 2007 in class 84 and subclass 609 teaches a graphical music creation user interface used to create and edit user compositions, which may then be transferred to a server and through a cell phone carrier network to cell phones or other portable devices. The compositions may be used as cell phone ring tones. Various graphical features allow for ease of music creation while providing a possibility for fine-tuning created pieces.

It is apparent that numerous innovations for ring tone related devices have been provided in the prior art that are adapted to be used. Furthermore, even though these innovations may be suitable for the specific individual purposes to which they address, they would not be suitable for the purposes of the embodiments of the present invention as heretofore described, namely, a method for developing a personalized blues-based ring-tone for a mobile telephone based upon characters and length of a full name of a user of the mobile telephone.

3. SUMMARY OF THE INVENTION

Thus, an object of the embodiments of the present invention is to provide a method for developing a personalized music (preferably blues) based ring-tone for a mobile telephone based upon characters and length of a full name of a user of the mobile telephone, which avoids the disadvantages of the prior art.

Briefly stated, another object of the embodiments of the present invention is to provide a method for developing a personalized music-based ring-tone for a mobile telephone based upon characters and length of a full name of a user of the mobile telephone. The method includes the steps of logging onto an appropriate website having an appropriate algorithm programed therein, navigating through the appropriate website to an appropriate input box therein, entering the full name of the user in the appropriate input box of the appropriate website to form an inputted full name, activating the appropriate algorithm on the appropriate website, correlating by the appropriate algorithm each letter of the inputted full name of the user to a look-up table stored in a memory that correlates alphabetic letters to notes to form correlated notes based on a 5-note scale and applied to one of several predetermined rhythm tracks, keys, and tempos and based upon the characters and the length of the full name of the user, retrieving the correlated notes, playing back to the user using an MIDI (musical instrument digital interface) instrument the correlated notes to form the personalized music based ringtone for the mobile telephone based upon the characters and the length of the full name of the user of the mobile telephone, and downloading by the user of the mobile telephone the personalized music-based ring-tone to the mobile telephone.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying drawing.

4. BRIEF DESCRIPTION OF THE DRAWING

The figures of the drawing are briefly described as follows:

FIG. 6 is a table indicating the desired and actual frequencies for each note;

Figure 7A:
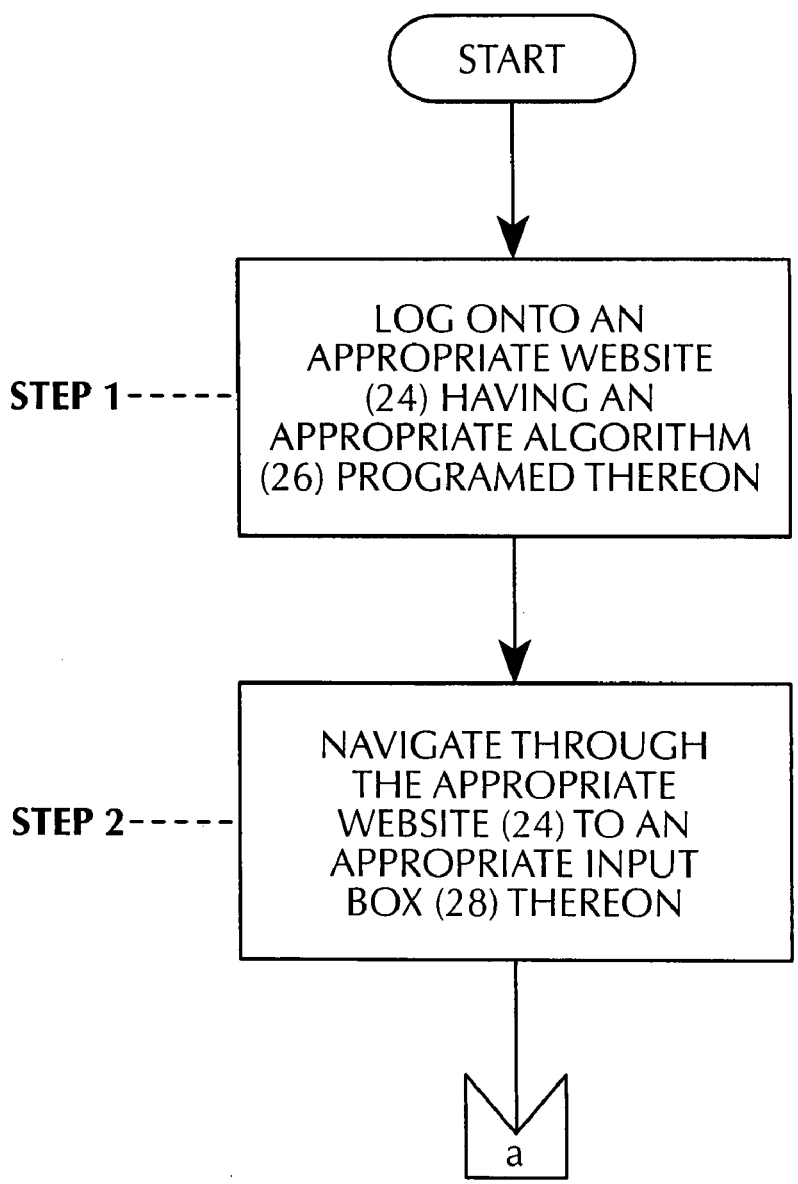
Figure 7B:
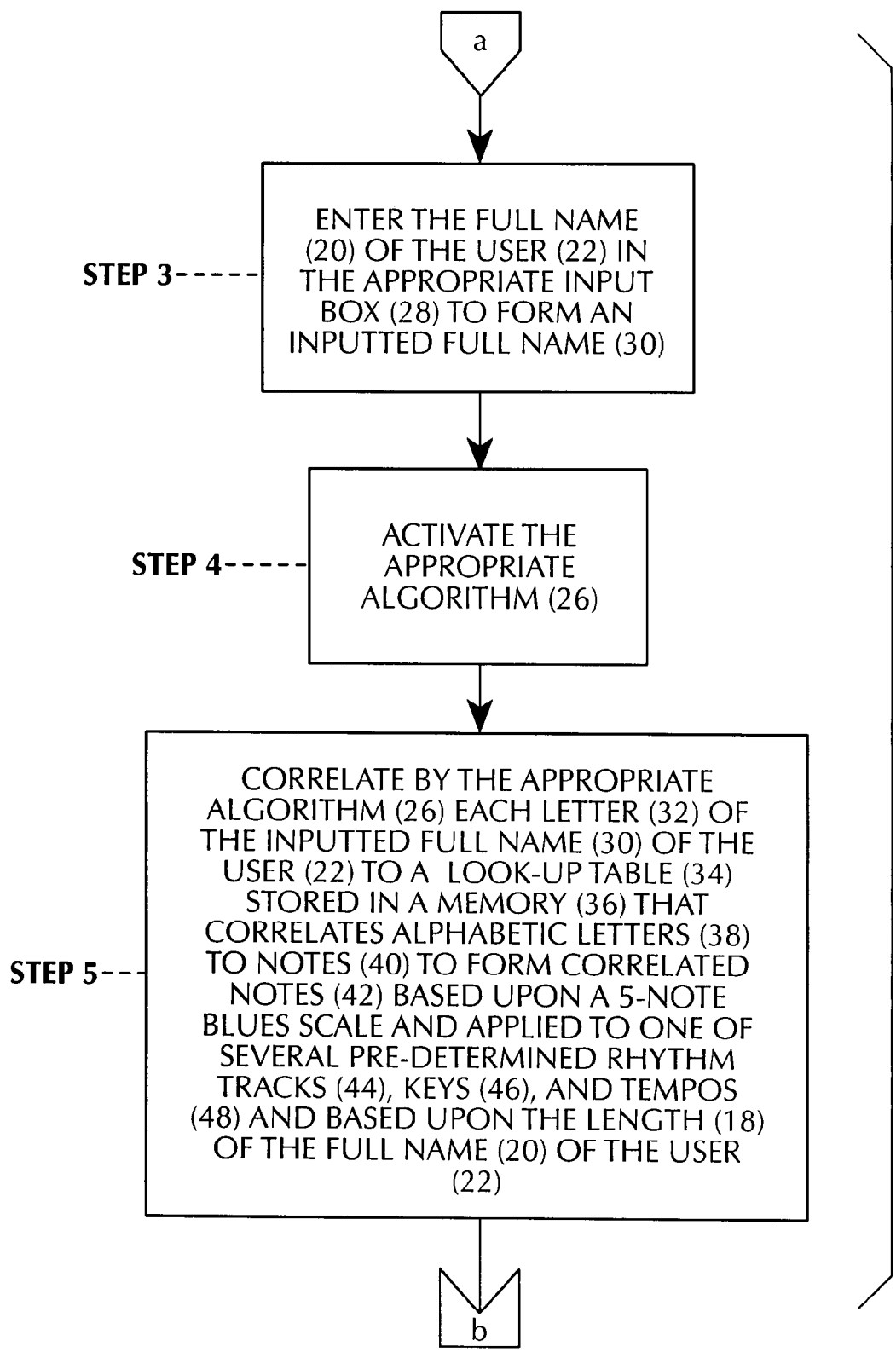
Figure 7C:
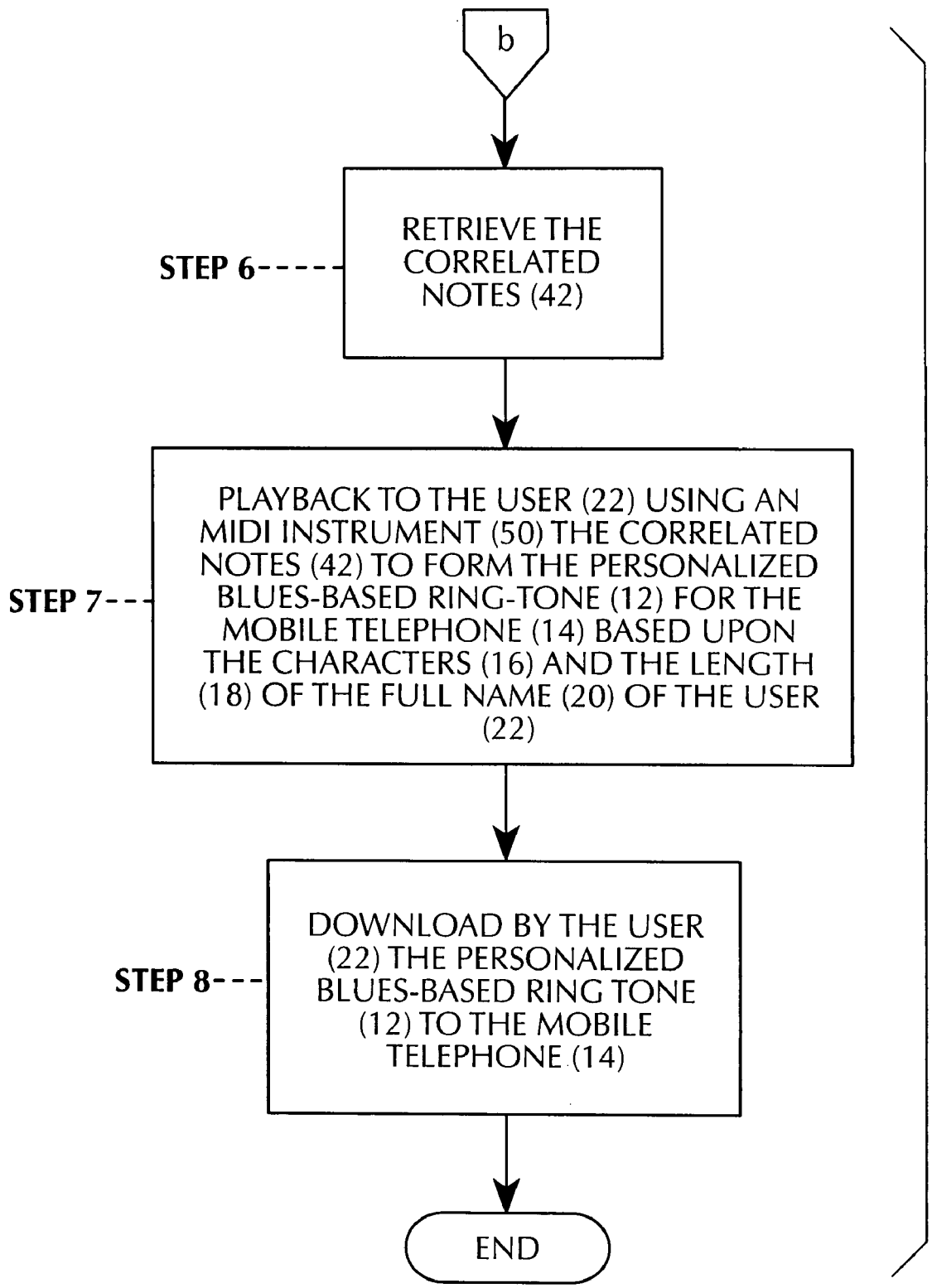
Figure 8:
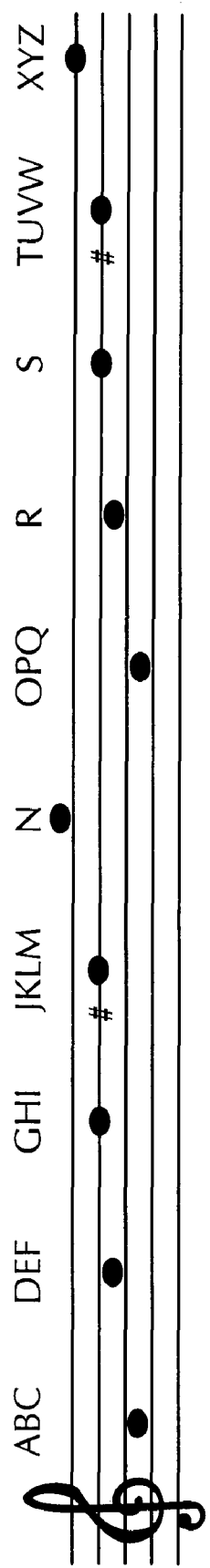

FIG. 7A-7C is a flowchart of the method of the embodiments of the present invention developing a personalized blues-based ring-tone for a mobile telephone based upon characters and length of a full name of a user of the mobile telephone; and FIG. 8 is a visual representation of a specific 5-note blues scale in C using 1, 2, 2#, 5, and 6 intervals from a 12-tone scale and being correlated to letters of the alphabet.

5. LIST OF REFERENCE NUMERALS UTILIZED IN THE DRAWING 10 method of embodiments of present invention for developing personalized blues-based ring-tone 12 for mobile telephone 14 based upon characters 16 and length 18 of full name 20 of user 22 of the mobile telephone 14
12 personalized blues-based ring-tone for mobile telephone 14 based upon characters 16 and length 18 of full name 20 of user 22 of mobile telephone 14
14 mobile telephone
16 characters of full name 20 of user 22 of mobile telephone 14
18 length of full name 20 of user 22 of mobile telephone 14
20 full name of user 22 of mobile telephone 14
22 user of mobile telephone 14
24 appropriate website
26 appropriate algorithm programed on appropriate website 24
28 appropriate input box on appropriate website 24
30 inputted full name of full name 20 of user 22 of mobile telephone 14
32 each letter of inputted full name 30 of user 22 of mobile telephone 14
34 look-up table
36 memory
38 alphabetic letters of look-up table 34
40 notes of look-up table 34
42 correlated notes
44 several pre-determined rhythm tracks
46 keys
48 tempos
50 MIDI instrument

6. DETAILED DESCRIPTION OF THE PREFERRED EMBODIMENTS

A. General

A ring tone is the sound made by a telephone to indicate an incoming call. The term, however, is most often used to refer to the customizable sounds available on mobile phones. This facility was originally provided so that people would be able to determine when their phone was ringing when in the company of other mobile phone owners.

There are numerous ring tone formats, for example:
eMelody—Older Ericsson format.
iMelody—Most new phones that don't do Nokia's Smart Messaging are using this format.
kws—Kyocera's ringer format.
mid/midi—Popular sound format.
morse code—Text files with a morse extension get converted into morse code songs.
mot—An older ringer format for Motorola phones.
MP3—Some phones support ring tones that are MP3 format.
nokia/sckl/ott—Nokia Smart Messaging format. Nokia phones can receive ring tones as a text message. Ring tone tools can create these text messages. This allows anyone with a compatible phone to load their own ring tones. There are other phones besides Nokia that use this.
pdb—Palm database. This is the format used to load ring tones on PDA phones, such as the Kyocera 6035 and the Handspring Treo.
rtttl—A popular text format for ring tones.
rtx—Similar to rtttl with some advanced features. Also the octaves are different on rtx.
samsung1 & samsung2—Samsung keypress format.
siemens keypress—Can create and read in a Siemens text file format.
siemens SEO—Siemens SEO binary format.

A phone only rings when a special "ringing signal" is sent to it. For regular telephones, the ringing signal is a 90-volt, 20-hertz, AC wave generated by the switch to which the telephone is connected. For mobile phones, the ringing signal is a specific radio-frequency signal.

Whereas older telephones simply used a pair of bells for the ringer, modern ring tones have become extremely diverse thereby leading to phone personalization and customization.

Newer mobile phones allow the users to associate different ring tones for different phone book entries. Taking advantage of these features, a new Ringtone Maker trend has emerged. For example, websites like Phone Sherpa and RingtoneSoup let users make ring tones from the music they already own from, e.g MP3, CD, etc., and upload directly to their mobile phone with no limit on the number of songs uploaded. In addition to the cost benefits, a key feature is that the music editor lets the user easily pick the part of the song they wish to set as a ring tone. These services automatically detect the phone settings to ensure the best file type and format. There are, however, providers whom have already edited and trimmed the song for a user.

Others also allow users to create their own music tones, either with a "melody composer" or a sample/loop arranger, such as the MusicDJ in many Sony Ericsson phones. These, however, use native formats only available to one particular phone model or brand. Although other formats, such as MIDI or MP3, are often supported, they must be downloaded to the phone before they can be used as a normal ring tone. Commercial ring tones take advantage of this functionality, which has led to the success of the mobile music industry.

A ring tone version of a user's new favorite song does serve some purpose. Of course it lets the user distinguish their own phone's ring from other phones ringing around them but more than anything else, it's a chance to add personality to technology.

The central "brain" of a cell phone is a small microprocessor. Just like the microprocessor in a computer, this unit controls everything that the cell phone does by working from information stored in the phone's memory. At its core, a ring tone is simply a computer program stored on the cell phone's memory chip. This program's sole purpose in life is to tell the microprocessor what the phone's speaker system should do when the phone's receiver picks up an incoming call. Ring tone-capable phones already have a range of notes stored in memory, i.e., they include information on speaker vibration frequencies that will produce particular tones. The ring tone program only has to tell the microprocessor which of these notes to play, in which order, and at what speed. By adjusting these variables, the microprocessor can play an infinite number of ring tones.

The clearest example of this sort of programming language is the Ringing Tone Text Transfer Language (RTTTL) format developed by Nokia. A typical section of an RTTTL code with a description of what each bit means can best be seen in FIGS.

1 and 2, which are, respectively, a typical section of an RTTTL code, and a description of what each bit means.

The Ring Tones text Transfer Language is a simple text-based format used to create ring tones that can be uploaded into a cell phone via various cell phone uploading techniques.

The RTTTL format is easy to learn and easy to use. Let's take a look at FIG. 3, which is the main theme from the first movement of Beethoven's Fifth Symphony, a simple well-known melody in standard musical notation—the main theme from the first movement of Beethoven's Fifth Symphony.

Figures 1, 2:
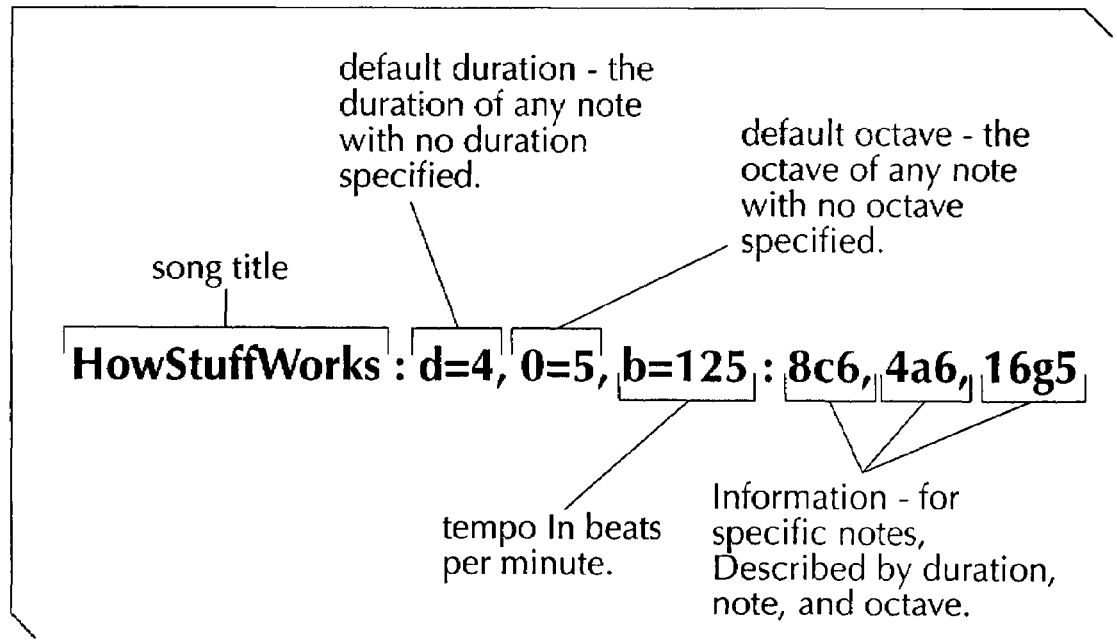
FIG. 1 is a typical section of an RTTTL code.
FIG. 2 is a description of what each bit in FIG. 1 means.
Figure 3:
FIG. 3 is the main theme from the first movement of Beethoven's Fifth Symphony.
Figure 4:
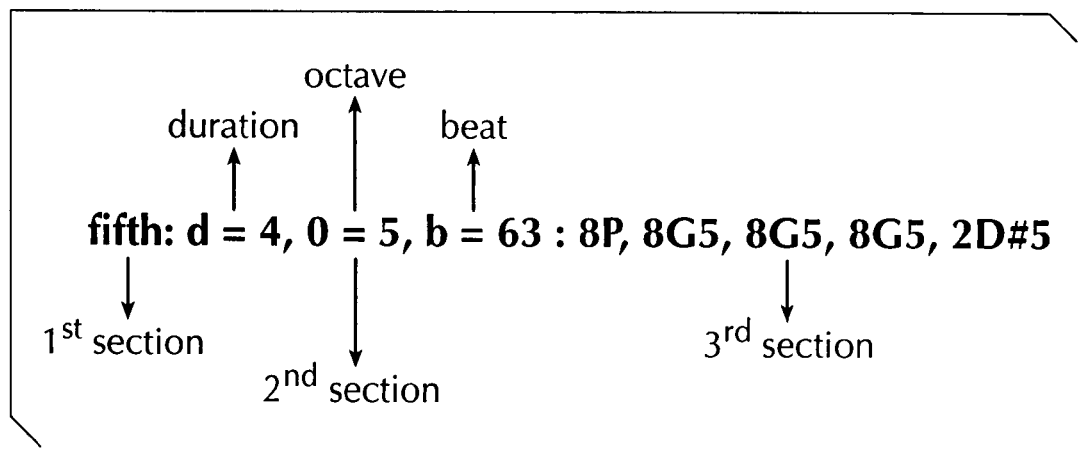
FIG. 4 is the melody shown in FIG. 3 in RTTTL.

Referring to FIG. 4, which is the melody shown in FIG. 3 in RTTTL, let's take a look at the same melody in RTTTL. The RTTTL file in general, and specifically that of FIG. 4, is made up of a single string divided into three separate sections separated by colons (":").

The $1^{st}$ section is the name of the RTTTL melody, i.e., the name or title.

The $2^{nd}$ section defines the default values for the file, i.e., the settings or control.

The $3^{rd}$ section describes the melody, i.e., the notes or note commands.

The structure for the $1^{st}$ section is straightforward and obeys a single rule, i.e., the name can have no more that 10 characters.

The $2^{nd}$ section is more complex. It describes the melody defaults. There are three categories of default values, namely, duration, octave, and beat. The way that RTTTL handles these default categories is to define each category with a single character and then assign a value to that character. The $2^{nd}$ section of the RTTTL shown in FIG. 4 shows the default values as follows:

Duration is defined by the letter "d".
Octave is defined by the letter "o".
Beat is defined by the letter "b".

Translating the default values into lay terms yields "the default values for this melody are as follows. Unless otherwise specified, any note played will have a duration of quarter note as indicated by the notation "d=4". Unless otherwise indicated, any note identified will be played in the $5^{th}$ octave as indicated by the notation "o=5". The tempo for this melody, i.e., how fast it goes, will be 63 beats per minute as indicated by the notation "b=63"."

The length of a musical sound is what is referred to as the duration of the note. If musicians had a more scientific heritage, duration would be indicated as a length of time, for example, play this note for a second, play that note for half a second, play another note for two seconds. But exact time notation is not in the musician's legacy. Instead, to the befuddlement of every elementary school music student, musical duration is measured relative to other notes using a system of whole notes, half notes, quarter notes, eighth notes, and so on. In most instances, the quarter note is the single unit of measure in which each quarter note receives one beat.

There are times when one might not want to play a note on a beat—just have silence. In musical terms, this is called a rest. RTTTL handles rests as pauses and can be programmed accordingly.

In RTTTL, one places a duration number before a pitch.

Think of an octave as the region that a scale occupies in musical space. RTTTL supports four octaves, from A below middle C to four scales up. RTTTL refers to these octaves by the numbers 5-8.

Musically, the beat is a measure on a per-minute basis. If a melody is assigned a "60 beats per minute" value, this means that the melody will get one beat each second. If one wants the melody to go twice as fast, one increases the beat to 120.

Figure 5:
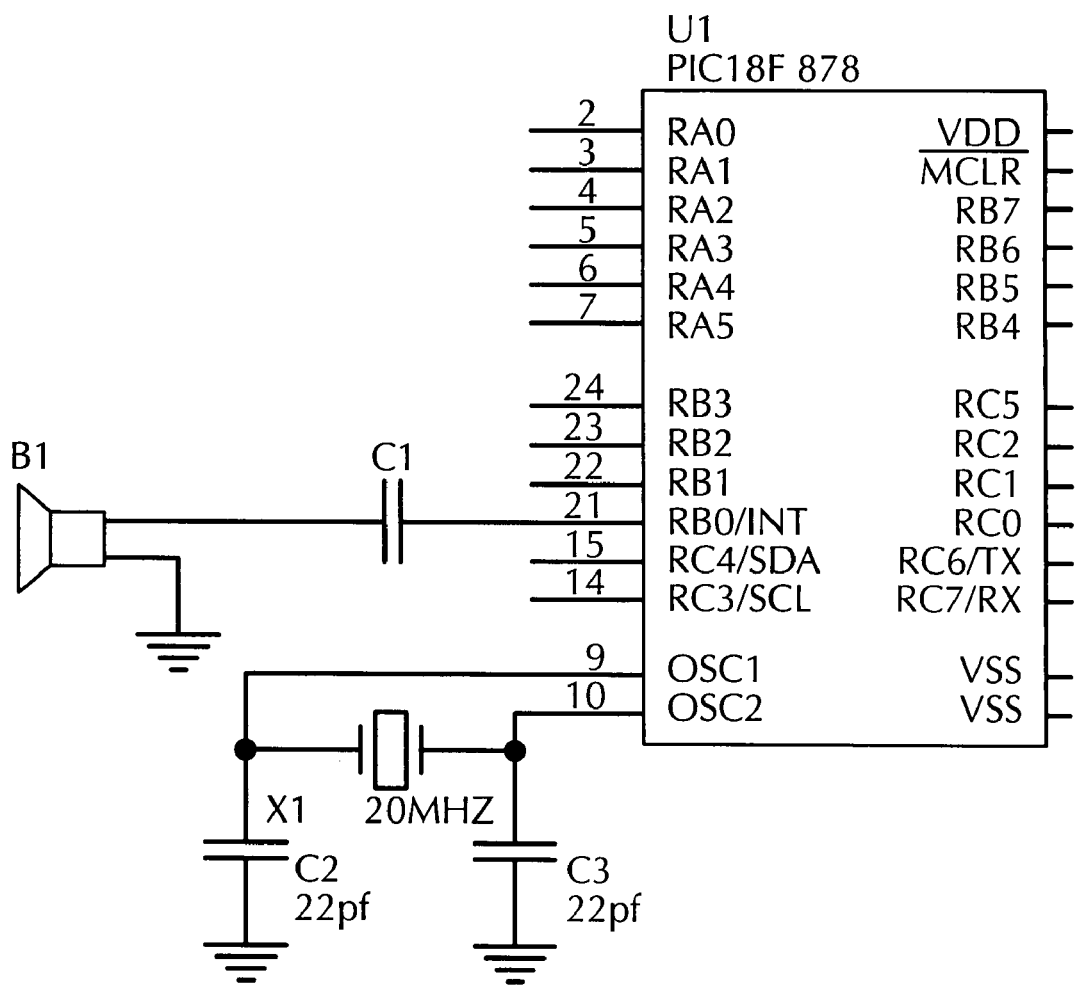
FIG. 5 is a schematic diagram of a circuit for generating ring tones.

FIGS. 5 and 6 are, respectively, a schematic diagram of a circuit for generating ring tones, and a table indicating the desired and actual frequencies for each note, wherein FIG. 5 shows that the circuit for generating ring tones is very simple.

B. The Embodiments of the Present Invention

Using the information above, referring now to FIGS. 7-A to 7-C and 8, which are, respectively, a flowchart of the method of the embodiments of the present invention developing a personalized blues-based ring-tone for a mobile telephone based upon characters and length of a full name of a user of the mobile telephone, and a visual representation of a specific 5-note blues scale in C using 1, 2, 2#, 5, and 6 intervals from a 12-tone scale and being correlated to letters of the alphabet, the method of the embodiments of the present invention is shown generally at 10 for developing a personalized blues-based ring-tone 12 for a mobile telephone 14 based upon characters 16 and length 18 of a full name 20 of a user 22 of the mobile telephone 14.

The method 10 comprises the steps of:

STEP 1: As shown in FIG. 7A, log onto an appropriate website 24 having an appropriate algorithm 26 programed thereon.

STEP 2: FIG. 7A, navigate through the appropriate website 24 to an appropriate input box 28 thereon.

STEP 3: As shown in FIG. 7B, enter the full name 20 of the user 22 in the appropriate input box 28 on the appropriate website 24 to form an inputted full name 30.

STEP 4: As shown in FIG. 7B, activate the appropriate algorithm 26 on the appropriate website 24.

STEP 5: As shown in FIG. 7B, correlate by the appropriate algorithm 26 each letter 32 of the inputted full name 30 of the user 22 to a look-up table 34 stored in a memory 36 that correlates alphabetic letters 38 to notes 40 to form correlated notes 42 based on a 5-note blues scale (FIG. 8) and applied to one of several pre-determined rhythm tracks 44, keys 46, and tempos 48 and based upon the length 18 of the full name 20 of the user 22.

STEP 6: As shown in FIG. 7C, retrieve the correlated notes 42.

STEP 7: As shown in FIG. 7C, playback to the user 22 using an MIDI instrument 50 the correlated notes 42 to form the personalized blues-based ring-tone 12 for the mobile telephone 14 based upon the characters 16 and the length 18 of the full name 20 of the user 22 of the mobile telephone 14.

STEP 8: As shown in FIG. 7C, download by the user 22 of the mobile telephone 14 the personalized blues-based ring-tone 12 to the mobile telephone 14.

C. The Conclusions

It will be understood that each of the elements described above or two or more together may also find a useful application in other types of constructions differing from the types described above.

While the embodiments of the present invention have been illustrated and described as embodied in a method for developing a personalized blues-based ring-tone for a mobile telephone based upon characters and length of a full name of a user of the mobile telephone, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A method for developing a personalized music-based ringtone for a mobile telephone based on a plurality of characters from a full name wherein a user inputs their first name/last name to a website or online venue, the method comprising:
   using the characters and length of said full name in determining:
   a tempo of said personalized music-based ringtone for said mobile phone;
   a musical key of said personalized music-based ringtone for said mobile phone;
   an instrument allocation of said personalized music-based ringtone for said mobile phone; and
   an underlying supporting rhythm track of said personalized music-based ringtone for said mobile phone, and
   determining, for each character of said plurality of characters of said inputted full name, a specific musical note of said personalized music-based ringtone for said mobile phone correlated to said each character in a pre-determined musical scale based upon an algorithm, wherein said algorithm is based on a blues scale following in the key of Bb7, and said algorithm comprising:

| Letters in name | Correlates with this note in the musical scale |
|---|---|
| "A", "B", and "C" | Major $6^{th}$ note (G) |
| "D", "E", and "F" | Minor $7^{th}$ note (A♭) |
| "G", "H", and "I" | Major $2^{nd}$ note (C) |
| "J", "K", "L", and "M" | Minor $3^{rd}$ note (C♯) |
| "N" | Major $5^{th}$ note (F) |
| "O", "P", and "Q" | Major $6^{th}$ note (G) |
| "R" | Minor $7^{th}$ note (A♭) |
| "S" | Major $2^{nd}$ note (C) |
| "T", "U", "V" and "W" | Minor $3^{rd}$ note (C♯) |
| "X", "Y", and "Z" | Major $5^{th}$ note (F). |

2. The method of claim 1, further comprising the playing back of:
   said determined tempo of said personalized music-based ringtone for said mobile phone;
   said determined musical key of said personalized music-based ringtone for said mobile phone;
   said determined instrument allocation of said personalized music-based ringtone for said mobile phone;
   said determined underlying supporting rhythm track of said personalized music-based ringtone for said mobile phone; and
   said determined correlated musical notes; and downloading said personalized music-based ringtone for said mobile phone.

* * * * *